March 23, 1971 L. NUTTING ET AL 3,572,235
CONTINUOUS COFFEE ROASTING APPARATUS
Filed April 1, 1969 4 Sheets-Sheet 1

INVENTORS
Lee Nutting
George S. Chong
Jarrott T. Miller
John G. McChesney
ATTORNEYS

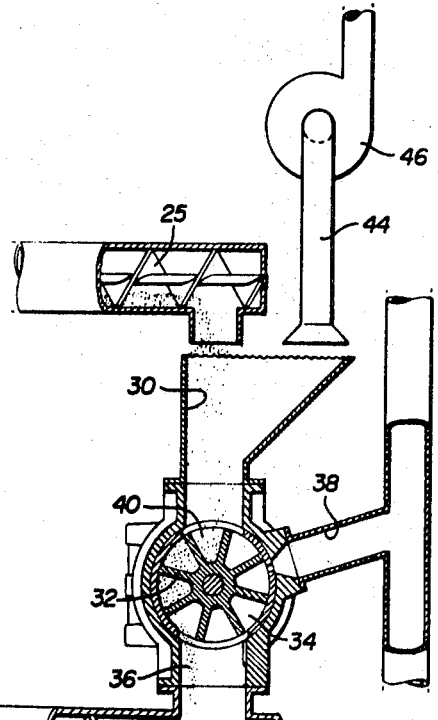
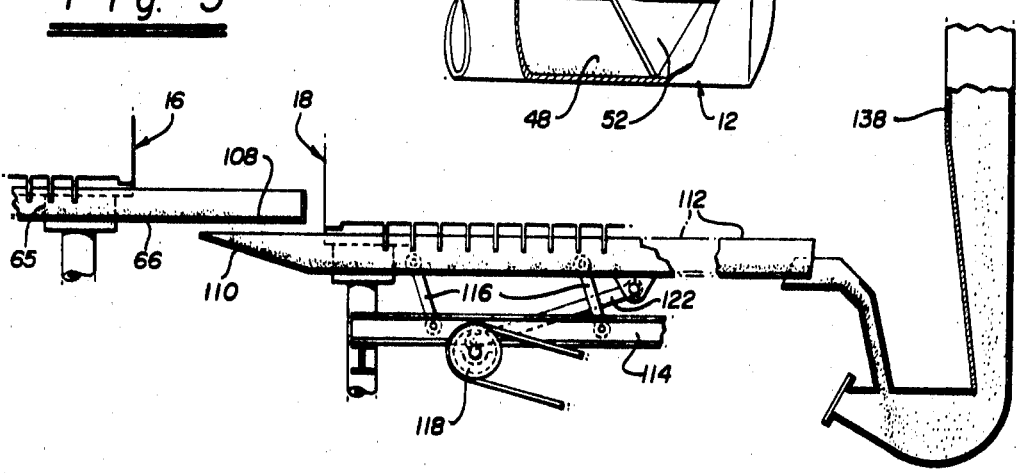

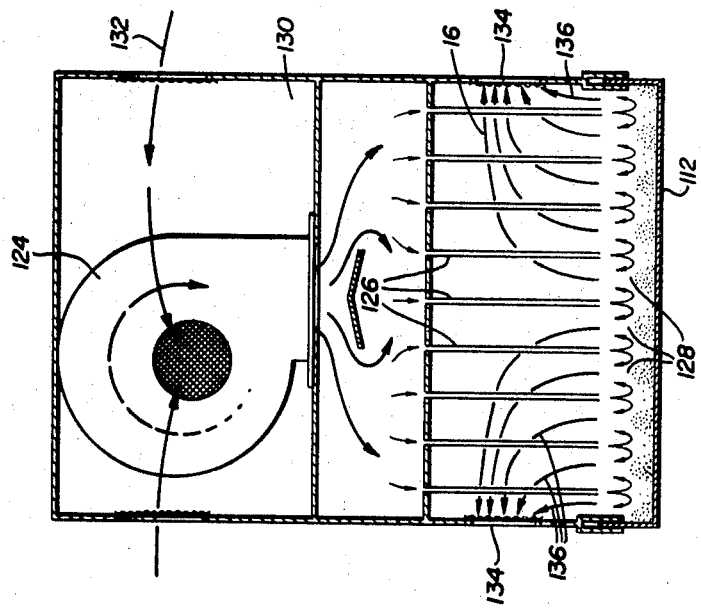
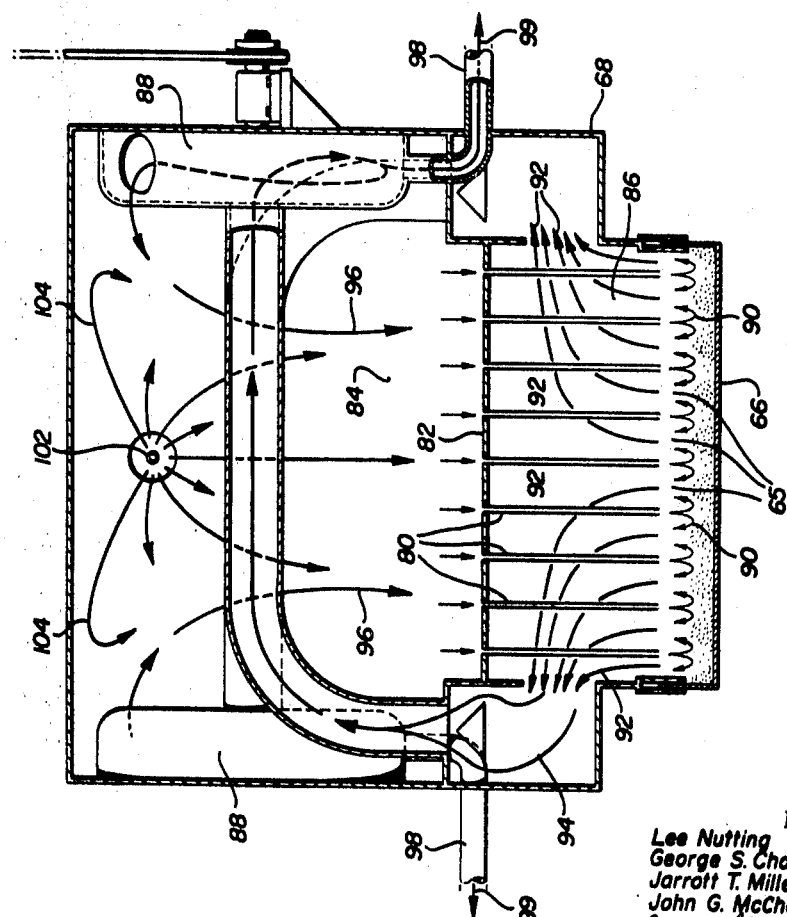

United States Patent Office 3,572,235
Patented Mar. 23, 1971

3,572,235
CONTINUOUS COFFEE ROASTING APPARATUS
Lee Nutting, Berkeley, George S. Chong, Kensington, Jarrott T. Miller, San Mateo, and John G. McChesney, Tiburon, Calif., assignors to Hills Bros. Coffee Inc., San Francisco, Calif.
Filed Apr. 1, 1969, Ser. No. 811,718
Int. Cl. A23f 1/02
U.S. Cl. 99—236                                     7 Claims

ABSTRACT OF THE DISCLOSURE

Apparatus for the continuous roasting of coffee beans including an elongated pressure vessel having a conveyor for moving the coffee beans through the pressure vessel during a pretreating stage. An impression plate together with directed streams of high velocity roasting gases against the plate to form a fluidized bed for the roasting of the coffee beans. After roasting a conveyor removes the roasted coffee beans from the fluidized bed for cooling.

---

This invention relates generally to a continuous process and apparatus for roasting coffee, and more particularly to a continuous roasting process and apparatus which insures that the aqueous extract or infusion of the roast coffee will be uniformly characterized by enhanced flavor and aroma.

It is well known that green coffee must be roasted before it achieves the flavor, taste and aroma that is conventionally associated with the freshly brewed coffee beverage. Green coffee beans possess none of these values. Thus, roasting not only gives a desired brown color but also effects an alteration of the natural elements present in the green beans to provide the aromatic qualities and taste or flavor values desired in the final beverage. It is also well known that full development of these desired flavor and aroma values is not easily achieved but depends on many factors, for example, the care with which the roasting operation is carried out, the proportion of the roast which is subjected to underroasting or overroasting, the skill and experience of the roaster, and the avoidance of the slight variations in the processing or in the operation of the roasting apparatus which might yield an undesirable result.

Until recently, virtually all coffee was roasted in rotary devices of the type first invented by Jabez Burns in 1881. These devices comprised solid drums which were revolved over a heated bed so that coffee beans within the drum were heated simply by contact with the shell. A great many of these roaster units are still in use today, although perforated roasting cylinders are preferred to the solid drums since they permit the heating gases to be drawn through the mass of coffee beans undergoing roasting. Roasting flame temperatures in these rotary units are generally quite high, ranging up to 2000° F., with the result that uniform roasting conditions are not easily obtained. Although attempts have been made to modernize the concept of the Burns roaster, particularly through use of large helically flanged rotating cylinders which operate on a continuous rather than a batch basis, little change has been made in the principle of operation or the performance of the roaster units. For example, although the temperature of the roasting atmosphere has been reduced somewhat, the roasting cycle still requires approximately the same length of time; the same lack of uniformity of roasting is still to be found within the beans of a particular roast.

In more recent times, various techniques using steam under pressure have been resorted to in an effort to overcome the difficulties encountered with the heated gas, revolving drum roasters. The roasting processes disclosed in Musher 2,278,473, Hale et al. 2,712,501, and Topalian et al. 3,080,825 are typical of these efforts. While the technique of steaming under pressure has been the subject of considerable investigation, the use of steam in these processes inevitably produces different processing conditions than the roasting gases employed in the revolving drum roaster. It is not clear, however, that these conditions are conducive to the formation of the desired flavor and aroma values which heretofore have been associated with coffee brews obtained from conventionally roasted coffee. Moreover, the time required to complete the roast at the steam pressures and temperatures employed tends to produce a degree of chemical change through hydrolysis which is not fully understood and which may actually impair the full development of desired flavors and aromas rather than enhance the same.

Various other roasting techniques have also been tried, for example, vacuum roasting and fluidized bed roasting but none of these techniques has found widespread acceptance and such techniques have been generally restricted to small batch operations.

The continuous roasting process of the present invention tends to eliminate the undesirable features of known roasting precesses and, at the same time, makes possible a degree of control over the roasting process with respect to development of flavor and aroma values which has not heretofore been possible.

Our new concept, embodied in the continuous roasting process of the present invention, effects an optimum development of flavor and aroma values from the original green coffee throughout the roasting process, while retaining the taste and aroma constituents in the end product to a maximum degree. It also permits a commercial operation wherein essential conditions of time, temperature, and throughput of coffee beans undergoing roasting can be optimally adjusted to insure the most successful commercial operation. Our new process provides a further advantage of extreme flexibility in the use of the processing equipment and thereby facilitates the ready adjustment of such equipment to optimum conditions for various types of blends of coffee. For example, we have found that our new process can be successfully employed to obtain desired taste and aroma characteristics in conjunction with greater quantities in the blend of the less expensive varieties of coffee beans (e.g. Robustas, hard Rios, etc.). Our new process also permits the maximum development of desired flavor and aroma characteristics in accordance with the differing requirements found in separate commercial markets, for example, in the larger cities.

It is accordingly an object of this invention to provide a continuous roasting process by which desired flavor and aroma characteristics are developed from the green coffee beans in a rapid controlled, economical manner, and in predictable reproducible fashion.

Another object of the invention is to provide a roasting process of the above character wherein undesirable flavor and aroma components are continuously diminished or eliminated, and desirable flavor and aroma components are continuously developed for retention in the end product.

Another object of the invention is to provide a continuous roasting process of such character making use of successive roasting stages, such stages making alternate use of steam under pressure and heated roasting gases.

A further object of the invention is to provide a novel system of apparatus for carrying out the continuous roasting process in the manner described.

Another object of the invention is to provide a novel roast coffee product in the form of roasted coffee beans incorporating volatile constituents possessing enhanced flavor and aroma characteristics.

Additional objects and advantages of the invention will appear from the following description in which an illustrative embodiment has been set forth in detail in conjunction with the accompanying drawing.

FIG. 4 is an enlarged view, partly in section and partly in elevation, illustrating a particular feature of the system of apparatus shown in FIG. 3;

FIG. 5 is a view like FIG. 4, illustrating a further feature of the system of apparatus shown in FIG. 3;

FIG. 6 is an enlarged view in transverse section along the line 6—6 of FIG. 3; and FIG. 7 is a like view along the line 7—7 of FIG. 3.

Generally stated, our new process for roasting green coffee to obtain roast coffee makes use of a continuous multi-stage process involving the progressive and continuous movement of green coffee through a preheating zone wherein the coffee beans are subjected to steam under pressure to effect hydrolysis and a partial roasting of the beans under substantially non-oxidizing conditions, following which the moistened, partially roasted beans are suddenly discharged from the preheating zone. Immediately thereafter the preheated beans are continuously and progressively moved through a roasting zone wherein the preheated beans are contacted with a hot roasting gas to effect further hydrolysis of the moist beans coupled with a controlled heating and drying of the beans under substantially oxidizing conditions, which complete the roast. Depending on characteristics of the green coffee and the degree of roast desired, the roasting may be completed in the roasting zone upon completion of the drying stage. Alternatively, the dried beans may be subjected to further action of the roasting gases in a controlled heating step which extends beyond completion of the drying stage. In a preferred practice of the invention, the controlled drying and roasting of the beans in the roasting zone is carried out in conjunction with high velocity streams of roasting gases which pass uniformly through the beans at a rate sufficient to fluidize the same, following which the roasted beans are rapidly cooled without substantial alteration in their moisture content.

We have found that the described continuous operations or steps are best carried out under controlled conditions of time, temperature and pressure to effect an initial partial roasting and moistening of the beans whereby the moisture content of the beans is increased in the preheating stage to about 12 to 18%, following which the moistened beans are dried concurrently with the fluidized roasting operation to desired moisture content of about 2 to 5%. As noted above, the subsequent cooling step is also preferably carried out in such fashion as to avoid substantial alteration in the desired moisture content, for example, in a fluidized cooling operation similar to the roasting operation.

In the continuous processing of the present invention, the described roasting operations or stages are carried out as well defined and separate steps in which time, temperature and throughput volume of coffee beans can be optimally adjusted to insure the most successful operation. An important aspect of our process is the discovery that development of desired coffee flavors and aromas can be obtained in a rapid, controlled, economical manner in the separate steps or stages, as determined both by conventional testing methods and by chromatographic analysis of volatile flavor and aroma chemicals stripped from the coffee beans at different points in the processing.

Figure 1:
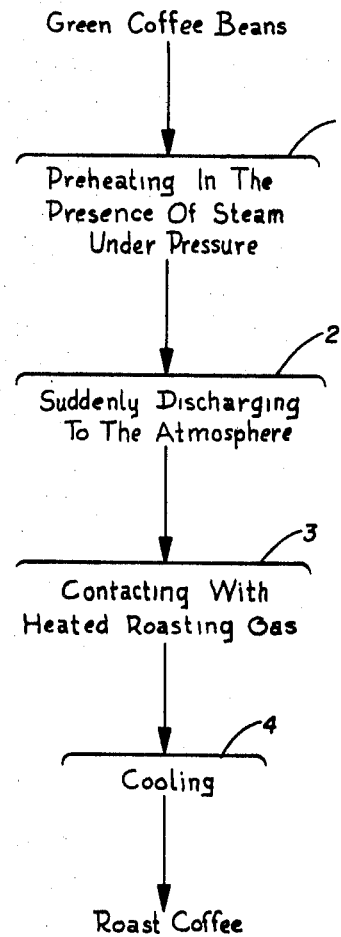
FIG. 1 is a flow sheet illustrating the general method of carrying out our continuous roasting process.

Referring to the drawings, FIG. 1 represents a general flow sheet of our new continuous roasting process, and particularly illustrates the main steps in sequence.

In Step 1, green coffee beans are initially preheated in the presence of steam under pressure, the pressure and temperature of the steam being preferably optimum for development of flavor and aroma values in the preheating step. For most coffee blends, initial flavor and aroma development is optimally obtained in the presence of steam at a pressure within the range from about 60 to 200 p.s.i. The temperature of the steam can be close to the saturation temperature, although we have obtained very satisfactory results employing steam temperatures somewhat below the saturation temperature of the steam at the pressure of operation. Indicated steam temperatures are within the range from 290 to 390° F. Under the conditions described, desired development of flavor and aroma values in the preheating stage can be obtained in a period of about 3 to 15 minutes, such period of time being sufficient to effect desired hydrolysis and a partial roasting of the beans under the substantially non-oxidizing conditions present in the preheating step. The hydrolysis in the "preheating" step effects a moistening of the beans so that the moisture content is increased from a normal value of about 11 to 14% for the green beans to a moisture content following preheating of about 12 to 18% (dry basis). The preheated beans also exhibit the characteristics normally obtained with a partial or light roast, that is, the beans have a brown color which is substantially lighter than the rich brown color normally produced by oxidative roasting processes.

In Step 2, the preheated partially roasted beans are suddenly discharged from the steam pressure conditions of the preheating step to the ambient atmosphere. This sudden discharge of the beans into the atmosphere is preferably a substantially instantaneous discharge, so that gases internally produced within the beans during the preheating cause a sudden swelling or disruption or "puffing" of the beans. This swelling or puffing is believed to be due to the generation of appreciable water vapor pressure in the tiny cells or pores of the beans during the preheating process. Upon ejection or discharge in Step 2, the water vapor within these tiny cells expands rapidly so that the cells are swollen or ruptured to produce a disrupted or puffed condition in the beans which generally gives rise to openings, crevices, passageways, or similar porous openings in the surface of the beans. This expanded structure of the preheated beans provides a relatively more porous bean surface than previously existed, which permits a more efficient penetration or entry of roasting gases within the structure of the coffee beans in the subsequent roasting steps.

In Step 3, the expanded preheated beans are subjected to the action of a heated roasting gas which effects a completion of the roast. We have found that the roasting is optimally completed in the presence of an atmosphere comprising intermixed air and combustion gases at a temperature of about 450 to 575° F. Since the preheated beans are in a moist condition, the heated roasting gas initially effects a further hydrolysis simultaneously with the heating and drying of the beans to remove the excess moisture. These roasting conditions are continued until the beans are dried to a substantially "dry" state (i.e., about 2 to 5% moisture content, dry basis). For certain varieties and blends of coffee beans, the roasting process will be completed when the beans have reached the dry state. For other varieties and blends of coffee beans, the contacting with the roasting gas may be continued beyond the drying to 2 to 5% moisture content, for a period of time sufficient to complete the roasting under substantially dry conditions. In either event, the roasting in Step 3 will generally be completed in a relatively short time (ranging from about ½ to 15 minutes), depending to some extent on the particular technique of contacting the beans with the hot roasting gas or gases.

In Step 4, the roasted beans are cooled by any suitable cooling technique to arrest the roasting operation. Cooling is likewise normally accomplished in a relatively short period of time, generally ranging from about ½ to 10 minutes.

Figure 2:
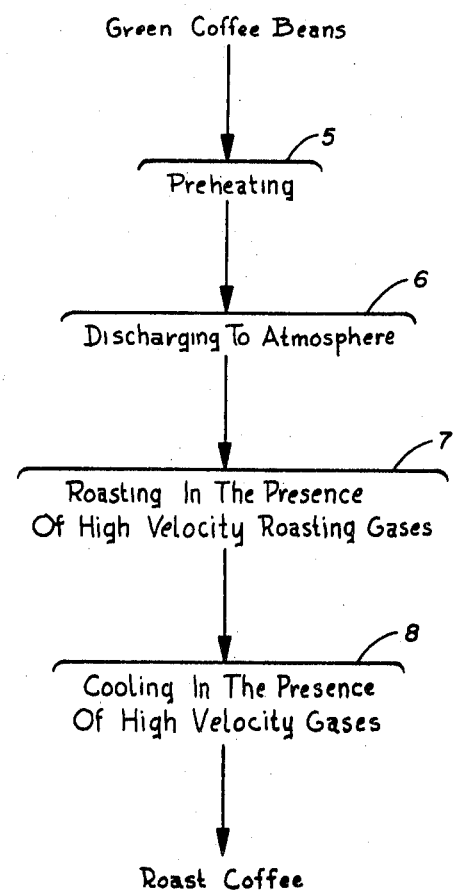
FIG. 2 is another flow sheet illustrating our method.

As illustrated in the embodiment of FIG. 2, beneficial results can be obtained in the practice of our invention through use of fluidization techniques in carrying out the roasting or cooling steps, or both. In Steps 5 and 6, the processing can be substantially as previously described in connection with Steps 1 and 2. In Step 7, preferred roasting conditions are obtained by introducing the roasting gases into the body of preheated beans as high velocity streams of roasting gas which pass through the beans at a rate sufficient to induce fluidization and therefore uniform heating of the beans. Roasting conditions are otherwise as previously described, except that the roasting step will normally be completed in a somewhat shorter period of time, ranging from about ½ to 4 minutes. In Step 8, the cooling is preferably carried out relatively rapidly under conditions which will prevent any substantial alteration of the moisture content. Thus, cooling has been satisfactorily accomplished by streams of high velocity ambient air which pass through the roasted beans at a rate sufficient to fluidize the same in a manner similar to the fluidized roasting carried out in Step 7. When cooling is accomplished by a fluidization step of this type, the cooling period will be generally less than about 2 minutes.

Figure 3:
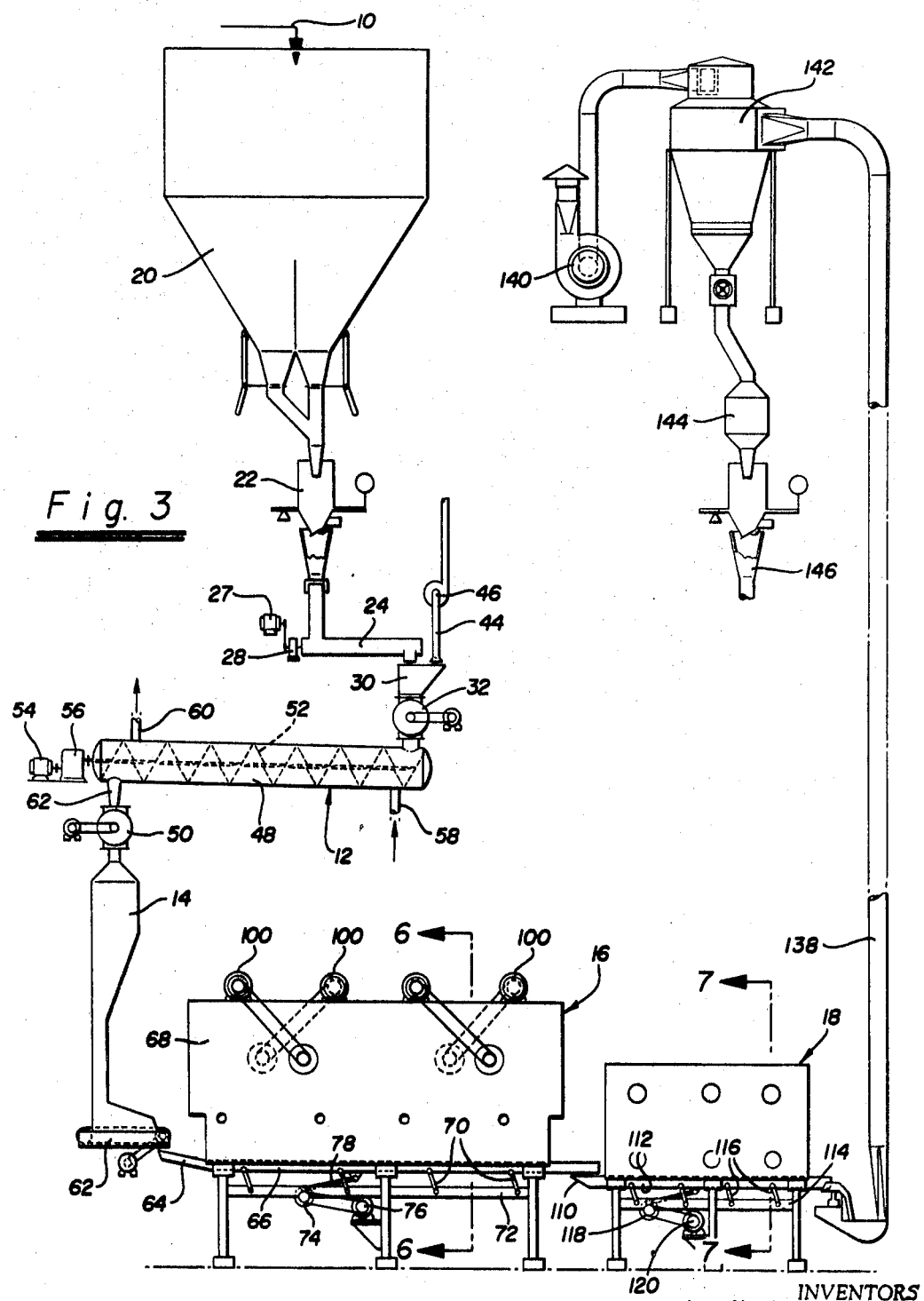
FIG. 3 is a schematic representation of a system of apparatus which is useful in carrying out our continuous roasting process.

FIG. 3 schematically illustrates a system of apparatus for carrying out our continuous roasting process, and additionally illustrates certain refinements in the processing to achieve a most efficient development of desired flavor and aroma values while diminishing or eliminating undesirable, harsh or bitter flavor and aroma constituents frequently developed in conventional roasting processes. As previously indicated, the processing is initiated by introducing the green coffee beans to the pressure stage. This phase of the processing is illustrated in the upper left hand portion of FIG. 3, which shows the introduction of the green coffee beans to the system at 10. With respect to the movement of coffee beans through the apparatus, the essential processing operations are the steam or preheating operation, generally carried out in a pressurized steam chamber or cylinder 12, a discharge or expansion operation, carried out in the housing 14, an air roasting or fluidized roasting operation carried out in the unit 16, and a cooling operation carried out in the unit 18. The described operations and units of apparatus generally perform and correspond to the steps of the processing as outlined in FIG. 1.

With specific reference to FIG. 3, green coffee is introduced to the system through a suitable feed hopper 20 and proportioning mechanism 22 to a feed conveyer unit 24. As shown in FIGS. 3 and 4, the feed conveyer may comprise a conventional screw conveyer 25 driven by a suitable motor 27 and varidrive control unit 28. The green coffee beans accordingly enter the system at a desired rate determined by the proportioning device 22 and the screw conveyer 24. The green coffee beans are discharged from the screw conveyer into a hopper 30 which is associated with a rotary feed valve 32. As illustrated in FIG. 3, the rotary unit 32 is constructed to serve both as a pressure lock and metering device for feeding the green coffee beans into the pressure cylinder 12. As will be understood, green beans fall into the upper compartments 34 of the rotary valve unit 32 and are conveyed by rotation of the unit (clockwise in FIG. 4) to a point of discharge as indicated at 36. To prevent accidental blowback due to steam pressure entering the rotary valve unit, an exhaust conduit 38 is preferably provided to exhaust the steam pressure trapped in the individual pockets 34, prior to return of the same to the upper or filling position at 40. An exhaust duct 44 powered by the blower 46 may also be provided to remove the exhaust steam escaping from the inlet rotary valve unit 32.

Referring to FIGS. 3 and 4, the pressure vessel 12 is in the form of a cylinder of appreciable length which provides a preheating zone or chamber 48 extending between the inlet rotary valve unit 32 and a similar discharge valve unit 50. The beans are advanced through the preheating zone 48 by means of a continuously operating helical screw 52. In a preferred embodiment the helical screw is provided with plastic edges which contact the inner cylinder wall in sealing or gas-tight relationship. The screw conveyer 52 is operated by the motor 54 and a suitable varidrive control unit 56 to advance the coffee beans through the preheating zone at a predetermined desired rate. In general, the drive units will be operated to advance the coffee beans at a rate to obtain a residence time within the pressure cylinder of about 3 to 15 minutes. During this advance the coffee beans are subjected to the action of steam under pressure which is introduced to the pressure cylinder from a suitable source through the steam inlet 58. Spent steam is simultaneously discharged from the system through the outlet 60. The steam pressures within the preheating zone may vary from about 60 to 200 p.s.i., depending on the character of the feed. The steam may be saturated or may be at temperatures slightly below the saturation temperature at the pressure of operation. The steam temperatures will accordingly vary between about 290 and 390° F.

In general, the preheating atmosphere created by the pressurized steam within the cylinder 12 induce non-oxidizing hydrolytic reactions within the coffee beans which, at the controlled conditions of pressure and time within the preheater, make possible a degree of control over the moisture conditions of the reaction and thereby the degree of hydrolysis. The preheating reactions can accordingly be adjusted to provide a controlled preliminary development of desired flavor and aroma values consistent with predetermined conditions of partial roast within the preheater.

Typically, the green beans fed to the preheater 12 will have a moisture content within a normal range of about 11 to 14%. The moistening of the beans due to the hydrolysis in the preheating zone 48 effects an increase in the moisture content of the beans (on a dry basis) to a final moisture content within the range of about 12 to 18%.

The preheated coffee beans are discharged from the preheating zone through a discharge conduit 62 to the rotary discharge valve 50. The latter is constructed to serve both as a discharge mechanism and a pressure lock in a manner similar to the rotary valve unit 32. In this case, however, there is no need for separate exhaust ducting since the roasted beans are desirably discharged suddenly and instantaneously into atmospheric conditions existing within the discharge housing 14. As previously noted, the instantaneous discharge of the beans into the ambient atmosphere produces a sudden disruption or puffing of the internal cells of the beans so that the beans are expanded simultaneously with the creation of crevices, passageways, and similar porous openings in the surface of the beans. The puffed or expanded beans fall naturally by gravity onto a feed conveyer 62 associated with the roaster unit 16. As illustrated in FIG. 3, the expanded preheated beans are discharged by the conveyer 62 onto an inclined chute or ramp 64 with the result that the beans are force fed by gravity into a roasting zone 65 (FIG. 5) within the roaster unit 16.

The roaster 16 generally operates to provide a controlled oxidizing heat treatment of the beans. In the preferred embodiment illustrated, this heat treatment is accomplished by high velocity streams of heated roasting gases which function to fluidize the beans within the roasting unit 16 and thereby to provide a uniform, even heat treatment. As particularly illustrated in FIGS. 3 and 6, the roster apparatus includes a gas impervious bed forming plate means 66, which is mounted for sliding vibratory movements with respect to the main housing 68 by means of parallelogram links 70 pivotally connected to the support frame 72. The plate 66 is vibrated in conventional manner by a rotary eccentric 74 driven by the motor 76 and connected to the plate by means of the connector link 78. The fluidizing apparatus can be of the type described and illustrated in Hoyt 3,229,377. Such apparatus generally makes use of a pattern of nozzles or tubes 80 which are suspended from a partition 82 which separates an upper plenum 84 within the roaster housing from an exhaust chamber 86. Fans or blowers 88 control the flow of air into the plenum 84 and through the tubes 80 to achieve a high velocity jet action below each tube, illustrated at 90, which serves to suspend the coffee beans in a fluidized state as they progress through the roaster As described in the patent, the fluidizing effect is achieved by the jetting of the roasting gases downward onto the gas impervious plate means 66 simultaneously with a rapid withdrawal of the gases upward through the blower units, for example, as indicated by the arrows 92 and 94. The major portion of the recirculated gases is returned to the tubes 80 as indicated by the arrows 96, a portion of the gases being simultaneously removed from the roaster through the exhaust ducts 98, as indicated by the arrows 99. As shown in FIGS. 3 and 5, the blower units 88 are suitably driven by motors or like drive units 100 which can be controlled to provide desired fluid velocities within the tubes 80. In general, the roasting gases are jetted through the tubes 80 at a velocity of the order of 12,000 feet per minute, causing the roasting gases to impact the bed forming plate 66 at high velocity and to flow outward and upward to lift the coffee beans off the plate in a fluidizing operation, as more particularly described in Hoyt 3,229,377.

The circulating gases in the roaster unit 16 are heated to effect the desired heat treatment and completion of the roast. Heating of the roasting gases may be accomplished by any suitable means. In the illustrated apparatus, the roasting gases are directly heated by injection and burning of a fuel gas within the plenum space 84. Apparatus for this purpose is illustrated in FIG. 6 in the form of an injection nozzle 102. It will be appreciated that burning of the fuel gas (i.e., natural gas, propane, or the like) within the plenum is accomplished by introduction of a combustible mixture of the gas with combustion air through the nozzle 102, the combustion gases being distributed throughout the plenum space 84, as indicated by the arrows 104. The roating gases within the roasting zone 65 therefore comprise intermixed air and combustion gases which preferably are heated by the process of combustion to a temperature within the range from about 450 to 575° F.

The heated roasting gases passing at high velocity through the tubes 80 effect a simultaneous fluidization and controlled drying and roasting of the beans in the roasting zone. Because the preheated beans entering the roaster 16 are moistened by the hydrolysis reactions within the prheater, the roasting gases initially effect a drying of the beans simultaneously with a further hydrolysis due to the heat and presence of moisture within the beans. These simultaneous reactions are carried out under substantially oxidizing conditions in the presence of the intermixed combustion gases and heated air. As the coffee beans proceed through the roaster (due to the force feeding and resulting sidewise impacts of the entering coffee beans with the fluidized beans in the zone 65), the roasting gases effect a continuous and progressive drying of the beans so that the moisture content of the beans is substantially reduced from the initial moist condition. More specifically, the moisture content is reduced from the relatively high moisture content (i.e., about 12 to 18%) produced in the preheating zone to the desired final condition of dryness (i.e., about 2 to 5% moisture, dry basis).

For certain varieties or blends, the heat treatment in the roaster unit may be discontinued on completion of the simultaneous drying and hydrolysis which initially occurs in the roasting zone 65. It will be appreciated that this initial wet roasting phase occurs as moisture is removed from the beans in the oxidizing atmosphere of the heated roasting gases. When sufficient moisture has been removed from the beans to achieve the final desired moisture content, the hydrolysis reactions are essentially completed and the roasting process may be discontinued. Alternatively, for other varieties and blends of coffee beans, it has been found desirable to carry the roasting process into a further stage during which a degree of pyrolysis occurs through continued heating of the dried beans in the presence of the oxidizing atmosphere of roasting gases. This further roasting state (apart from the fluidizing action) may be likened to a conventional air roasting step. In general, the degree to which one or both of the described roasting phases is carried out within the roaster 16 will depend primarily upon the characteristics of the green beans introduced to the system, including characteristics contributed by any preconditioning of the green beans which may have been carried out according to conventional practice (e.g., preroasting).

Regardless of whether the heat treatment in the roaster 16 involves one or two roasting stages, the roasting operation performed is supplemental to the partial roast achieved in the preheater 12 and serves to further develop desired flavor and aroma values with simultaneous reduction or elimination of undesirable flavor and aroma constituents as developed in conventional roasting processes.

Following the roasting operation in the roaster 16, the hot roasted beans are discharged from the end of the bed forming plate 66 into the cooling unit 18. Referring particularly to FIGS. 3 and 5, the roasted beans can be discharged through a screening means 108 which removes any oversized material which may still remain within the material undergoing processing. The beans discharged through the screen 108 are received on a chute or ramp 110 which is similar in construction to the feed ramp 64 for the roaster unit 16. In fact, the entire cooling unit may be similar in general construction to the roaster unit, with the ramp 110 forming a part of a vibrated gas impervious plate means 112 within the cooler. As illustrated in FIGS. 3, 5 and 7, the plate means 112 can be substantially identical to the plate means 66 except for somewhat shorter length which provides a cooling period of shorter duration than the roasting period. Thus, the plate 112 can be supported on the framework 114 by a similar parallelogram linkage including the links 116. Vibration can be similarly accomplished by means of a rotating eccentric 118, driven by the motor 120 and connected to the plate by the connecting link 122. Cooling gases (i.e., ambient air) may be circulated within the cooling unit 18 by a fan or blower unit 124 which functions to circulate the cooling air downward through the tubes 126 to effect fluidization of the beans in a cooling zone, generally represented at 128, in the same fashion as in the roaster. In general, the cooling action is accomplished by direct circulation of ambient air into the plenum space 130, as indicated by the arrows 132, following which the cooling gases are exhausted through screened outlets 134, as generally indicated by the arrows 136 (see FIG. 7).

In a typical operation of the roasting and cooling units, the beans are advanced by the rate of feeding the beans onto the ramp 64 so that the progress of the beans through the roaster is generally accomplished in a period of about ½ to 4 minutes. During this continuous progressive movement of the beans, the beans are in a constant state of fluidization induced by the circulating roasting gases by vibration of the bed through the vibratory unit 74. The rate of feed through the cooling unit is likewise determined by the rate of feed to the roaster, the beans passing into the cooler at substantially the rate of discharge from the roaster. Under normal conditions of operation, cooling can generally be accomplished within the cooling unit in a period of about ½ to 2 minutes.

In the illustrated apparatus, the cooled roasted beans are discharged from the end of the cooler bed plate 112 into the suction end of a vacuum conveyance system, generally represented at 138. Conveyance is induced by a blower unit 140 which operates through a cyclone 142 to separate the roasted beans from the conveying air streams and to discharge the same through a suitable metering device 144 for subsequent feeding to various unit processes within the plant. As will be appreciated, some further cooling of the roasted beans takes place in the conveyance of the beans through the system 138 and cyclone 142, and prior to discharge to subsequent plant process.

The roast coffee products produced by our continuous process have been subjected to extensive testing for purposes of comparing their flavor and aroma characteristics with those of conventionally roasted coffees. In addition to the taste tests customarily employed, the testing has included the preparation and comparative analyses of large numbers of flavor and aroma profiles obtained by techniques of gas-liquid chromatography. The latter merely substantiate the findings of the professional coffee tasters, who invariably have shown a preference for a beverage product produced from the roast coffee of our continuous process, as related to a like beverage product produced from roast coffee obtained by a conventional roast. Repeated testing and analysis have demonstrated this flavor preference as a preference in terms of the volatile components which are augmented or enhanced by our continuous processing, complemented by an elimination or supression of volatile components regarded as being detrimental to taste and aroma qualities.

Many variations are possible in the processing herein described and in the use in the exemplary systems of apparatus disclosed. For example, while the multi-stage preheating nad roasting steps are essential to a satisfactory performance of our process, it may be desirable in some instances to carry out the oxidative roasting step in conjunction with apparatus which does not employ or require fluidization of the coffee beans. In like fashion, the cooling in unit 18 may be eliminated, or alternate cooling techniques may be employed. These and other variations will be appreciated by the workers in this art, and can be easily adapted to the disclosed continuous process and system of apparatus without change in the overall concept of the processing. This has been found to be particularly the case because of a demonstrated ability to analyze the flavor and aroma profile related to given set of processing conditions to insure that desired product flavor characteristics are being consistently obtained. Accordingly, it should be understood that the disclosures herein are intended to be purely illustrative and not in any sense limiting.

We claim:

1. In apparatus for the continuous roasting of coffee beans wherein roast coffee of enhanced flavor and aroma is obtained, the combination of: means forming a pressure vessel of appreciable length, means for introducing steam under pressure to said pressure vessel, means for continuously introducing green coffee beans to said pressure vessel without loss of steam pressure, means for continuously advancing green coffee beans through said pressure vessel, means for continuously discharging treated coffee beans from said pressure vessel without loss of steam pressure, gas impervious plate means forming a bed for receiving treated coffee beans discharged from said pressure vessel, said plate means having an inclination less than that which would cause gravity flow of said coffee beans, means for directing streams of high velocity roasting gases against said gas impervious plate means to thereby fluidize treated coffee beans deposited on the surface of said plate means, said means for directing said high velocity streams of roasting gases against said plate means including means to heat said roasting gases to thereby effect roasting of the beans in said fluidized bed, and means to continuously convey roasted coffee beans away from said plate means and to cool the same.

2. Apparatus as in claim 1 including means for vibrating said gas impervious plate means.

3. In apparatus for continuously roasting green coffee beans to obtain roast coffee characterized by enhanced flavor and aroma, the combination of: wall means forming a gas-tight chamber, means to introduce steam under pressure to said chamber, means for conveying green coffee beans through said chamber, said last named means including means to prevent loss of steam under pressure from said chamber, wall means forming a fluidizing chamber, means for suddenly removing preheated partially wet roasted coffee beans from said gas-tight chamber and for immediately introducing the same to said fluidizing chamber, means for introducing high velocity streams of roasting gases into said fluidizing chamber, said last named means including blower means, means to heat the roasting gases introduced to said blower means, and means to continuously remove roasted coffee beans from said fluidizing chamber and to cool the same.

4. Apparatus as in claim 3 wherein said means for preventing loss of steam under pressure in said pressure vessel comprise rotary vapor locks positioned at the inlet and discharge ends of said pressure vessels.

5. Apparatus as in claim 3 wherein said fluidizing chamber is provided with bed forming means having an inclination less than that which would cause gravity flow, and means to vibrate said bed forming means.

6. Apparatus as in claim 3 wherein said means to introduce high velocity streams of roasting gases to said fluidizing chamber comprises a plurality of spaced nozzles directed substantially perpendicularly with respect to said bed forming means.

7. Apparatus as in claim 3 wherein said means for continuously cooling roasted coffee beans removed from said fluidizing chamber comprises a second fluidizing chamber and means for directing high velocity streams of cooling gases through said chamber.

References Cited

UNITED STATES PATENTS

| | | | |
|---|---|---|---|
| 2,278,473 | 4/1942 | Musher | (99—65)UX |
| 2,497,501 | 2/1950 | Himmel et al. | 99—68 |
| 2,857,683 | 10/1958 | Schytil | 99—68X |
| 3,088,825 | 5/1963 | Topalian et al. | 99—68 |
| 3,229,377 | 1/1966 | Hoyt | 34—57(A)X |
| 3,262,217 | 7/1966 | Brown et al. | 34—57(A) |
| 3,399,462 | 9/1968 | Koch et al. | 34—57(A) |
| 3,427,008 | 2/1969 | Geoffroy | 34—57(A)X |

BILLY J. WILHITE, Primary Examiner

A. O. HENDERSON, Assistant Examiner

U.S. Cl. X.R.

34—57